US011513940B2

(12) United States Patent
Kuehnis et al.

(10) Patent No.: US 11,513,940 B2
(45) Date of Patent: *Nov. 29, 2022

(54) SYSTEM, APPARATUS AND METHOD FOR DYNAMIC TRACING IN A SYSTEM

(71) Applicant: Intel Corporation, Santa Clara, CA (US)

(72) Inventors: Rolf Kuehnis, Portland, OR (US); Peter Lachner, Heroldstatt (DE)

(73) Assignee: Intel Corporation, Santa Clara, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 17/115,967

(22) Filed: Dec. 9, 2020

(65) Prior Publication Data

US 2021/0089427 A1 Mar. 25, 2021

Related U.S. Application Data

(63) Continuation of application No. 16/292,850, filed on Mar. 5, 2019, now Pat. No. 10,901,871.

(51) Int. Cl.
*G06F 11/34* (2006.01)
*G06F 11/30* (2006.01)
*G06F 15/78* (2006.01)

(52) U.S. Cl.
CPC ...... *G06F 11/3495* (2013.01); *G06F 11/3082* (2013.01); *G06F 15/7807* (2013.01); *G06F 15/7867* (2013.01)

(58) Field of Classification Search
CPC ............ G06F 11/3466; G06F 11/3476; G06F 11/348; G06F 11/3495; G06F 11/3636;
(Continued)

(56) References Cited

U.S. PATENT DOCUMENTS 6,678,838 B1 1/2004 Magro
7,260,745 B1 8/2007 Edwards et al.
(Continued)

FOREIGN PATENT DOCUMENTS

WO 2006133362 12/2006
WO 2011104245 9/2011

OTHER PUBLICATIONS

Intel Corporation, "Intel Atom Processor E3800 Product Family," Jul. 2014, 4 pages.
(Continued)

*Primary Examiner* — Gabriel Chu
(74) *Attorney, Agent, or Firm* — Trop, Pruner & Hu, P.C.

(57) ABSTRACT

In one embodiment, an apparatus includes: a first trace source to generate a plurality of first trace messages and a first local platform description identifier to identify the first trace source; a second trace source to generate a plurality of second trace messages and a second local platform description identifier to identify the second trace source; and a trace aggregator coupled to the first and the second trace sources, the trace aggregator to generate a global platform description identifier for the apparatus and output a trace stream including the global platform destination identifier, the first and second local platform description identifiers, the plurality of first trace messages and the plurality of second trace messages. Other embodiments are described and claimed.

22 Claims, 15 Drawing Sheets

(58) Field of Classification Search
CPC . G06F 11/364; G06F 11/3082; G06F 15/7807
See application file for complete search history.

(56) References Cited

U.S. PATENT DOCUMENTS

| | | |
|---|---|---|
| 9,568,547 B2 | 2/2017 | Menon et al. |
| 9,575,537 B2 | 2/2017 | Ignowski et al. |
| 9,753,836 B2 | 9/2017 | Menon et al. |
| 2003/0140263 A1 | 7/2003 | Arends et al. |
| 2003/0229823 A1 | 12/2003 | Swaine |
| 2004/0078685 A1 | 4/2004 | Glass |
| 2008/0155351 A1 | 6/2008 | Flake |
| 2008/0263044 A1 | 10/2008 | Cantrill |
| 2009/0132863 A1 | 5/2009 | Ashfield |
| 2009/0249046 A1 | 10/2009 | Berg |
| 2010/0268990 A1 | 10/2010 | Zheng et al. |
| 2013/0191693 A1 | 7/2013 | Ross |
| 2015/0227598 A1 | 8/2015 | Hahn |
| 2016/0063356 A1 | 3/2016 | Gukal |
| 2016/0077905 A1 | 3/2016 | Menon et al. |
| 2016/0259005 A1 | 9/2016 | Menon et al. |
| 2016/0274187 A1 | 9/2016 | Menon et al. |
| 2016/0283345 A1 | 9/2016 | Gounares |
| 2017/0286499 A1* | 10/2017 | Bingham .............. G06F 11/323 |
| 2018/0373607 A1 | 12/2018 | Kuehnis et al. |
| 2019/0129754 A1* | 5/2019 | McCrary ............... G06F 9/5011 |
| 2020/0285559 A1 | 9/2020 | Kuehnis |

OTHER PUBLICATIONS

MIPI Alliance, "Architecture Overview for Debug," White Paper, Version 1.2, Jul. 13, 2018, 68 pages.
Wikipedia, "MIPI Debug Architecture," this page was last edited on Dec. 21, 2018, 7 pages.

* cited by examiner

SYSTEM, APPARATUS AND METHOD FOR DYNAMIC TRACING IN A SYSTEM

This application is a continuation of U.S. patent application Ser. No. 16/292,850, filed Mar. 5, 2019, the content of which is hereby incorporated by reference.

TECHNICAL FIELD

Embodiments relate to tracing techniques for semiconductors and computing platforms.

BACKGROUND

Trace is a debug technology used widely in the semiconductor and computing industry to address, e.g., concurrency, race conditions and real-time challenges. Modern processors such as system on chips (SoCs) often include several hardware trace sources, and users are adding their software (SW)/firmware (FW) traces to the same debug infrastructure. For systems that aggregate several different trace sources into a combined trace data stream, a receiving tool has to have a priori knowledge of the system that generated a particular trace stream. For example, a system ID can be used to unwrap the merged trace stream into different logical trace streams and identify each trace stream's trace source and its underlying trace protocol for decode.

A static assignment of trace sources and a static assignment of trace protocols to those sources are used. However, some systems do not have a static system topology, and thus cannot effectively leverage available tracing systems. Undecodable traces due to missing information of the origin (platform) of the traces may reduce or even completely eliminate debugging capabilities, which increases the effort to identify and triage issues on customer platforms and can have a negative impact on product releases.

DETAILED DESCRIPTION

Figure 1:
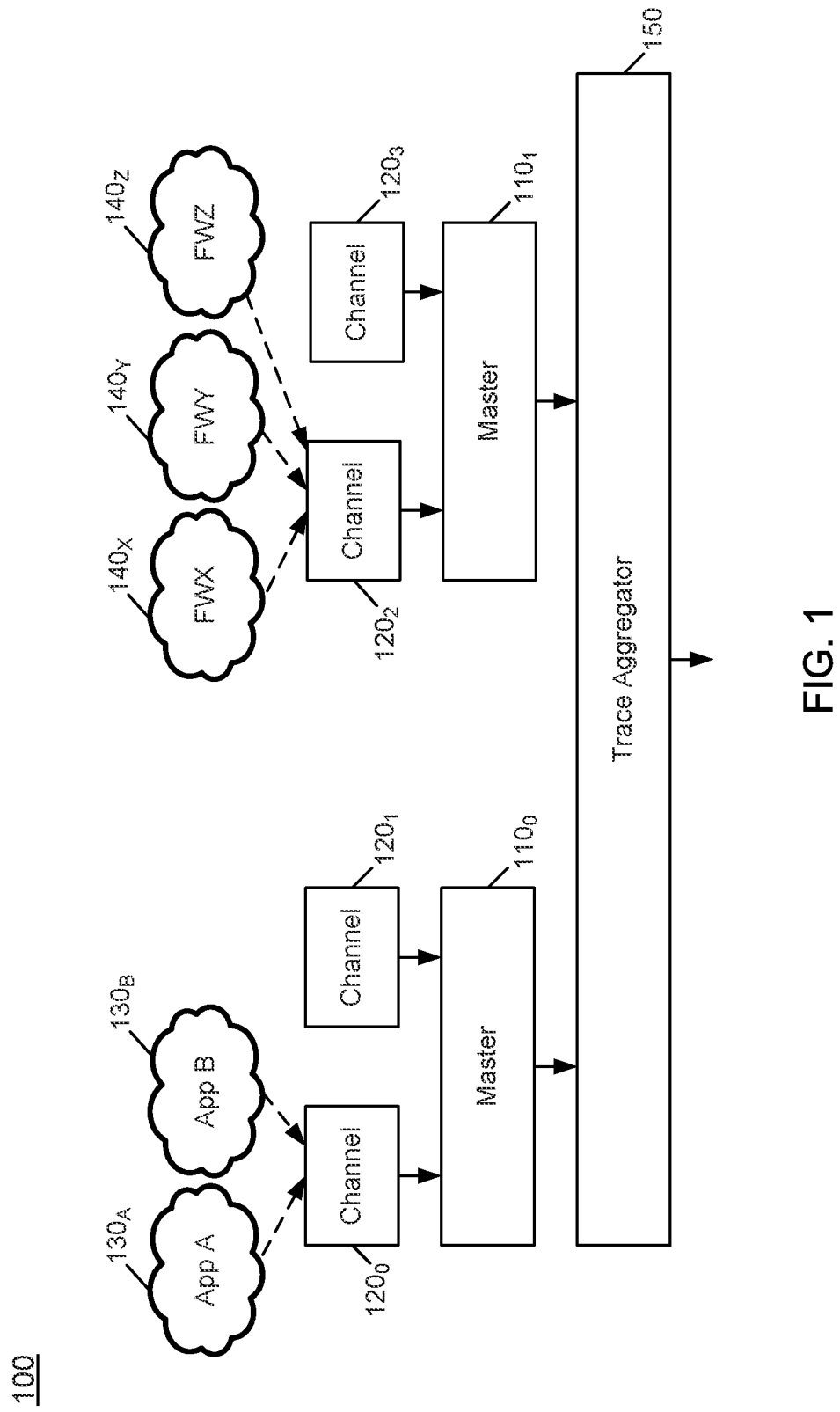
FIG. 1 is a block diagram of a portion of a processor in accordance with an embodiment.

In various embodiments, a debug system is provided with techniques to provide a platform description composed out of an accumulation of descriptions (subsystem descriptions). This platform description identifier is used to describe arbitrary complex systems via support for indefinite deep nesting of subsystems and an arbitrary amount of subsystem descriptions. By way of the temporal nature of each description item, systems can be dynamically changed while maintaining debug capabilities. Such changes may include physical changes (e.g., plug/unplug components), changes due to power options (powering up or down of components), dynamically loading/unloading software/firmware modules and code paging in microcontrollers, among others.

With embodiments, a processor or other SoC can provide a more reliable and higher quality output to trace analysis tools. Embodiments reduce the risk of totally unusable data, by providing the ability to properly decode traces. And with embodiments, message content is reduced via the techniques described herein to reduce code density, especially as compared to use of a globally unique identifier (GUID) on every message. As such, embodiments realize higher code density and lower trace bandwidth requirements.

As used herein, a "trace" is a stream of data about system functionality and behavior of a target system, transported to a host system for analysis and display. In other cases, the trace can be self-hosted, in which the data is consumed in the system itself by a debug engine that decodes and potentially visualizes the data. A "trace source" is an entity inside the system that generates trace information using a defined protocol. A "platform description ID" (PDID) describes a (sub)system or part of it. A (sub)system could be a single trace source or another complex nested (sub)system. In turn, platform description metadata information translates the PDID into data to configure a debug component processing the given trace stream. And in turn, a platform description is the accumulation of all platform description metadata of the received platform description IDs at a particular point in time. As used herein, a "decoder system" is a collection of software components to decode a single trace source entity (also called a subsystem herein). A "decoder book" is the collection of different "decoder systems" (also known as subsystem decoders) to decode traces from a system described by a single ID code.

In different embodiments, the destination of tracing information may be a remote entity to receive the tracing information via a streaming interface or a local storage, e.g., in a ring buffer, main memory of a file system. In embodiments, there are two flavors of the platform description ID (PDIDs), which together enable a unique trace source identification. A global PDID is used to define the name space of the trace decoding, and is a root for the decoder. In turn, local PDIDs are part of the name space. These local PDIDs are unique in the name space created by the global PDID.

In operation, a PDID is periodically injected into the trace stream, which in one embodiment is a SoC-wide Joint Test Action Group (JTAG) ID code, to ground the decoding to a specific product. While a JTAG code is one implementation, other unique identifiers can be used such as a System GUID or any other vender-defined unique number. This can be done in case of a MIPI system trace protocol (STP) wrapper protocol via periodic synchronization messages such as an STP ASYNC message. Other synchronization point injections are possible, such as at the start or end of an ARM or MIPI Trace Wrapper Protocol (TWP) frame boundary. This enables a clear identification of a trace log to a hardware product. In case of a ring buffer, ASYNC messages ensure that at least 1 (or 2) ASYNC packets are available. Having an ASYNC message in the ring buffer ensures decoding, e.g., according to a given sampling theorem. For example, ASYNC messages may be injected at half of the ring buffer size (such as according to a Nyquist-Shannon sampling theorem). With the PDID extension, the root is in the trace storage.

During the tracing, one or several specific platform description identifier(s) per subsystem may be sent. These identifiers can be issued from a firmware engine, a hardware block or a software process or application. The messages may be timestamped to provide information when some subsystems become available or become invisible (dormant, removed, etc.).

As one example an application can send its PDID(App) at its start, while a more static firmware engine periodically can send its PDID(FW). Note that PDID data can also be stored in parallel (out-of-band) for offline read when needed. As an example, the data may be stored on a target system's file system together with the traces for later consumption.

Referring now to FIG. 1, shown is a block diagram of a portion of a processor in accordance with an embodiment. As shown in FIG. 1, processor 100 may be a multicore processor or other type of system on chip (SoC). In the illustration of FIG. 1, processor 100 is shown with a logical view with regard to debug aspects of the processor. More specifically, several masters $110_0$, $110_1$ are shown. As examples, masters 110 may be representative collection points for various hardware circuitry, such as a given die, high level domain or so forth. In turn, multiple channels 120 may be present in association with corresponding masters 110. In embodiments, channels 120 may be processing circuits such as processing cores, graphics processors, interface circuitry or any other type of circuitry. More specifically, channels $120_0$, $120_1$ are associated with master $110_0$, while channels $120_2$, $120_3$ are associated with master $110_1$. As another example, some of the trace sources may be embedded controllers, chiplets, Peripheral Component Interconnect Express (PCIe) compute components, field programmable gate array (FPGA) and graphics processing unit (GPU) extension cards, companion dies and so forth.

As further illustrated, representative channels $120_0$, $120_2$ may have their configurations dynamically updated during operation, e.g., based on execution of particular code. For example, different applications $130_{A,B}$ may execute on channel $120_0$. As will be described herein, a dynamic identifier may be associated with channel $120_0$ depending upon which application 130 is in execution. In this way, trace messages generated within channel $120_0$ during application execution may be appropriately decoded based at least in part on using a local platform description identifier associated with a particular decoder (that in turn is associated with the corresponding application in execution). Similarly, channel $120_2$ may be dynamically re-configured to execute different firmwares, e.g., firmwares $140_{X-Z}$. In similar manner, a dynamic identifier may be associated with channel $120_2$ depending upon which firmware 140 is in execution.

Note that, especially with regard to applications 130 and firmware 140, it is possible for third party vendors to provide such components, and thus a processor manufacturer has less visibility (a priori) information as to their arrangement and use.

As further shown in FIG. 1, masters 110 are in communication with a trace aggregator 150, which may be implemented as a given hardware circuit such as dedicated debug circuitry, general purpose processing circuitry or so forth, and in some cases may be implemented at least in part in firmware, software and/or combinations thereof. In embodiments, trace aggregator 150 may generate a merged trace stream, which it may communicate to a given destination, e.g., an on-chip storage or a chip-external location, such as an external debug and test system (DTS). In any event, trace aggregator 150 may generate a global platform description identifier for communication within the trace stream, and may receive incoming local platform description identifiers and trace messages from given masters 110, and interleave the received information into the trace stream for communication to the destination. Understand while shown at this high level in the embodiment of FIG. 1, many variations and alternatives are possible. For example, while FIG. 1 shows a high level logical view, understand that a given processor may be implemented as one or more semiconductor die implemented within an integrated circuit.

Figure 2:
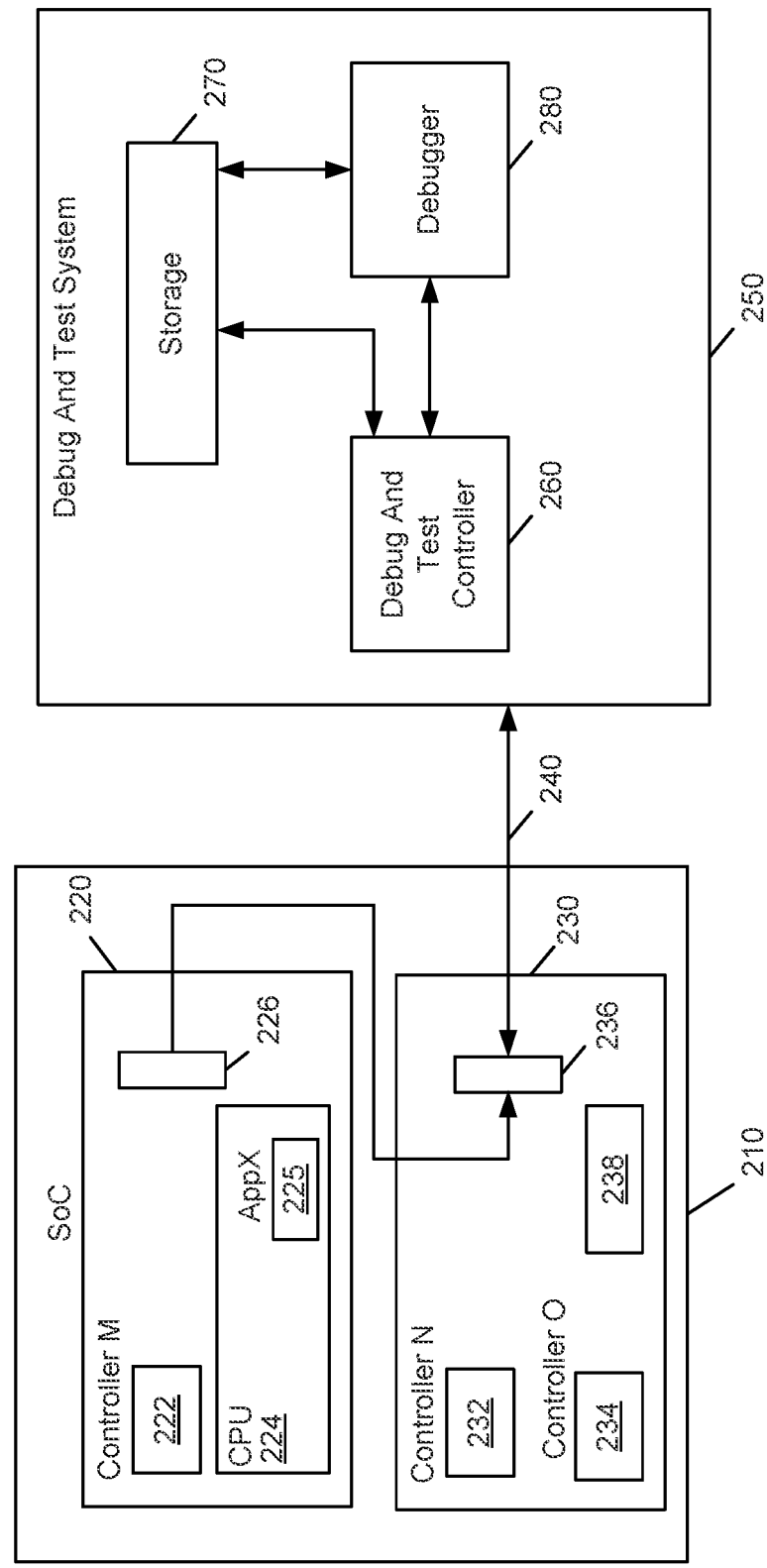
FIG. 2 is a block diagram of a system in accordance with an embodiment of the present invention.

Referring now to FIG. 2, shown is a block diagram of a system in accordance with an embodiment of the present invention. As shown in FIG. 2, a debug scenario occurs in an environment 200 in which an SoC 210 couples to a debug and test system (DTS) 250. As shown in FIG. 2, SoC 210 may be implemented as a multi-die package, including a first die 220 and a second die 230. In the embodiment shown, first die 220 includes a given controller 222 and a central processing unit (CPU) 224 on which an application 225 executes. While only these limited components are shown in FIG. 2, understand that a given die may include many additional components.

As further represented with regard to trace information, trace messages and associated platform description identifiers as described herein generated in CPU 224 and controller 222 may couple through a first level trace aggregator 226 for communication to a second level trace aggregator 236 of second die 230.

As illustrated, second die 230 further includes controllers 232, 234. In addition to interleaving trace messages and local platform description identifiers from controllers 232, 234, trace aggregator 236 further interleaves message information received from trace aggregator 226. With the arrangement in FIG. 2, merged trace messages from controller 222 and CPU 224 as aggregated in trace aggregator 226 may be sent into an input port of trace aggregator 236, where such messages may be further aggregated with the trace messages received from controllers 232, 234. As further illustrated in FIG. 2, SoC 210 also may include a memory 238 such as a given non-transitory storage medium in which trace information may be stored. Although in the embodiment of FIG. 2 memory 238 is shown as present on second die 230, understand that in other cases, it may be located on first die 220 or on another die of SoC 210.

Further in the embodiment of FIG. 2, SoC 210 couples to DTS 250 via a link 240. In different embodiments, link 240 may be implemented with a connector to communicate trace and control information, e.g., according to a parallel trace information (PTI) format or a format for another link such a universal serial bus or Ethernet link. In the high level shown in FIG. 2, DTS 250 includes a debug and test controller 260, which may initiate test operations within SoC 210 and receive a trace stream therefrom. In turn, debug and test controller 260 may provide trace messages to debugger 280, which may decode the information stored therein using one or more decoders present in one or more decoder books. In an embodiment, a decoder storage may take the form of a hierarchical decoder structure to be accessed using a combination of a global platform description identifier and local platform description identifiers. As further illustrated in FIG. 2, DTS 250 also includes a storage 270, which may be implemented as a non-transitory storage medium. In some cases, storage 270 may store a decoder, such as a hierarchical decoder structure as described herein. In other cases, such decoder may be present within debugger 280 itself.

With an arbitrarily nested system as in FIG. 2, the following PDIDs in Table 1 may be used to identify the system components. In Table 1, various components within SoC 210 may be associated with given master identifiers and channel identifiers, and similarly may communicate PDIDs that have a payload corresponding to a given identifier such as a custom identifier, GUID or other such value.

TABLE 1

| ASYNC | VERSION PDID_TS (global) IDcode SocA TS(n) |
|---|---|
| M#/C# - Controller 232 | PDID_TS (sub-system) CUSTOM-ID (Controller 232) TS (n + 1) |
| M#/C# - Controller 234 | PDID_TS (sub-system) GUID (Controller 234) TS (n + 2) |
| M#/C# - N-2-S | <nested STP from Die-220 NPK as D64s> |
| M#/C# - Controller 222 | PDID_TS (sub-system) CUSTOM-ID (Controller 222) TS (n + 3) |
| M#/C# dyn SW apps | PDID_TS (sub-system) GUID (AppX) TS (n + 100) |

When tracing in environment 200, each die 220, 230 may periodically send its unique identifier (e.g., a JTAG ID code) into the single trace stream, each defining an independent name space. This identifier grounds the decoding. In some cases it is possible for each die to be assigned a master ID and corresponding channel IDs for software that runs on such masters. In other cases, depending on die structure (e.g., whether there is a trace link between the dies or a full interconnect), hardware sources of the other die may be viewed as masters, or a complete die may be added into one single master of a main trace merging unit.

In an embodiment, a firmware engine typically has a fixed code and therefore fixed trace sources. Such trace sources may send periodically a fixed PDID. Such fixed PDIDs (also referred to herein as static PDIDs) may be used to enable a decoder to debug trace messages following this PDID within the trace stream in a first step of decoding. And with a fixed PDID, more traces can be made visible in a second step of decoding (namely those trace messages received pre-PDID). In contrast, other firmware engines may perform paging, where the performed task is changed dynamically for such engines. The PDID is flexible, and only traces after the PDID is received become visible, and thus trace messages following this dynamic PDID may be decoded in a single step of decoding. As another example, plug-in cards, sending traces via second die 230, may inject another global PDID and further fixed or flexible PDIDs. In an embodiment, a discrete GPU likely has a fixed PDID, while an artificial intelligence (AI) accelerate card provides mainly flexible PDIDs.

Figure 3:
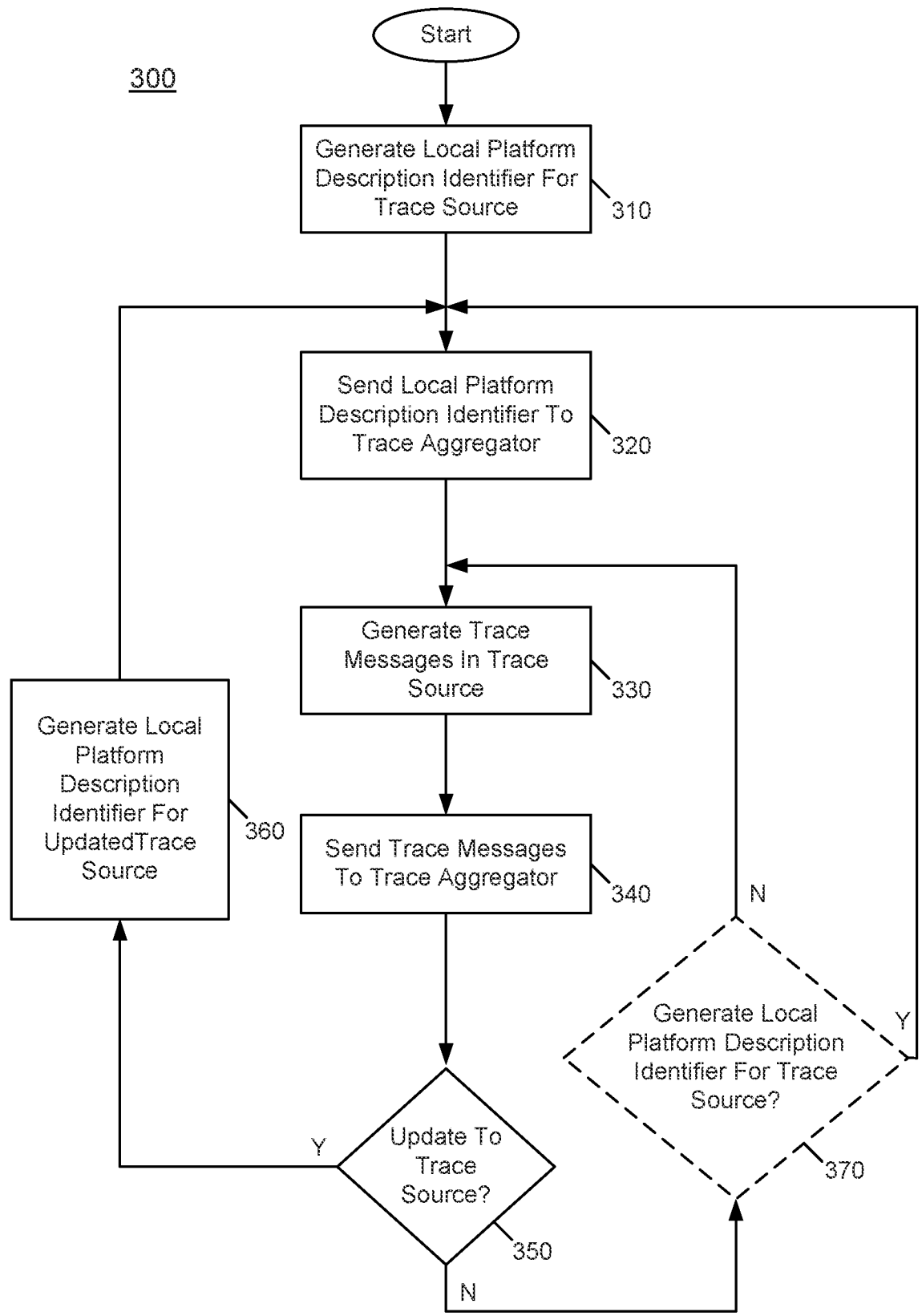
FIG. 3 is a flow diagram of a method in accordance with an embodiment of the present invention.

Referring now to FIG. 3, shown is a flow diagram of a method in accordance with an embodiment of the present invention. More specifically, method 300 shown in FIG. 3 is a method for providing trace information from a trace source in accordance with an embodiment. As such, method 300 may be performed by hardware circuitry, firmware, software and/or combinations thereof such as may be implemented in a given trace source, e.g., a processor core or other hardware circuit.

As illustrated, method 300 begins at block 310 by generating a local platform description identifier for the trace source. This identifier may include various information fields, including an indication as to whether the local PDID is a static identifier or a dynamic identifier. The decision to enable a given trace source for static or dynamic identification may be based on whether the trace source can be dynamically updated, e.g., with programming such as execution of a given application, or installation of a particular firmware. In any event, control next passes to block 320 where the local PDID is sent to a trace aggregator, e.g., an on-chip circuit. Thereafter at block 330 trace messages may be generated in the trace source. The trace messages may provide information regarding particular execution instances within the trace source. Thereafter, at block 340 the trace messages can be sent to the trace aggregator.

Still with reference to FIG. 3, understand that a given trace source may periodically update its configuration, e.g., by installation of a new application, firmware or in another manner. In such case it is determined at diamond 350 that an update has occurred to the trace source. In this instance, control passes to block 360 where an updated local PDID may be generated for this updated trace source. Control next passes to block 320 discussed above. Instead if it is determined that there is no update to the trace source, it may periodically be determined, optionally (at diamond 370) whether it is appropriate to send another instance of the local PDID (which in this case does not change in this static situation). If it is determined that it is appropriate to generate and send the local PDID again, control thereafter passes to block 320, discussed above. Otherwise control passes back to block 330. Understand while shown at this high level in the embodiment of FIG. 3, many variations and alternatives are possible.

Figure 4:
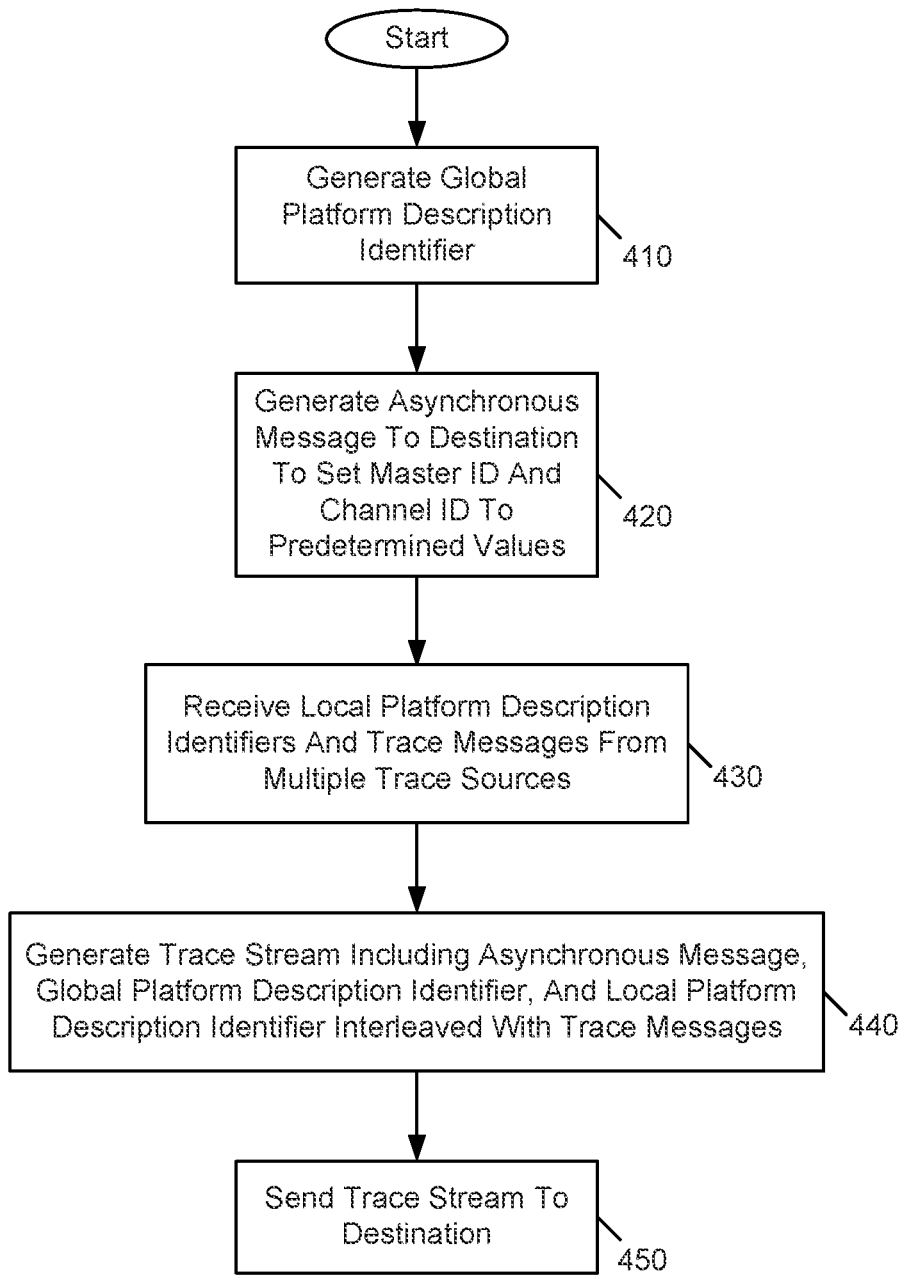
FIG. 4 is a flow diagram of a method in accordance with another embodiment of the present invention.

Referring now to FIG. 4, shown is a flow diagram of a method in accordance with another embodiment of the present invention. More specifically, method 400 shown in FIG. 4 is a method for aggregating trace information in a trace aggregator in accordance with an embodiment. As such, method 400 may be performed by hardware circuitry, firmware, software and/or combinations thereof such as may be implemented in a given trace aggregator, which may be implemented as a trace merging unit of a MIPI Trace Wrapper Protocol (TWP) or a MIPI System Trace Protocol (STP), or any other fabric to act as a merging function.

As illustrated, method 400 begins by generating a global platform description identifier (block 410). As an example, the trace aggregator may generate this global PDID when it is to begin performing debug operations. Next at block 420 an asynchronous message may be prepared as part of a synchronization sequence, which is sent to the destination to set a master identifier and a channel identifier to predetermined values (block 420). As an example, this asynchronous message may set master and channel IDs both to zero. Understand of course that other values are possible, and it is further possible that different ID values for master and channel can be set by way of an asynchronous message. At this point, the trace aggregator is ready to send a trace stream including aggregated trace messages.

Control next passes to block 430 where local PDIDs and trace messages may be received from multiple trace sources.

Next at block 440 the trace aggregator may generate a trace stream that includes various information, including the asynchronous message, the global PDID and local PDIDs, which may be interleaved with the trace messages themselves. Thereafter at block 450 this trace stream is sent to the destination, which may be a destination storage or an external debug and test system. Understand while shown at this high level in the embodiment of FIG. 4, many variations and alternatives are possible.

Figure 5:
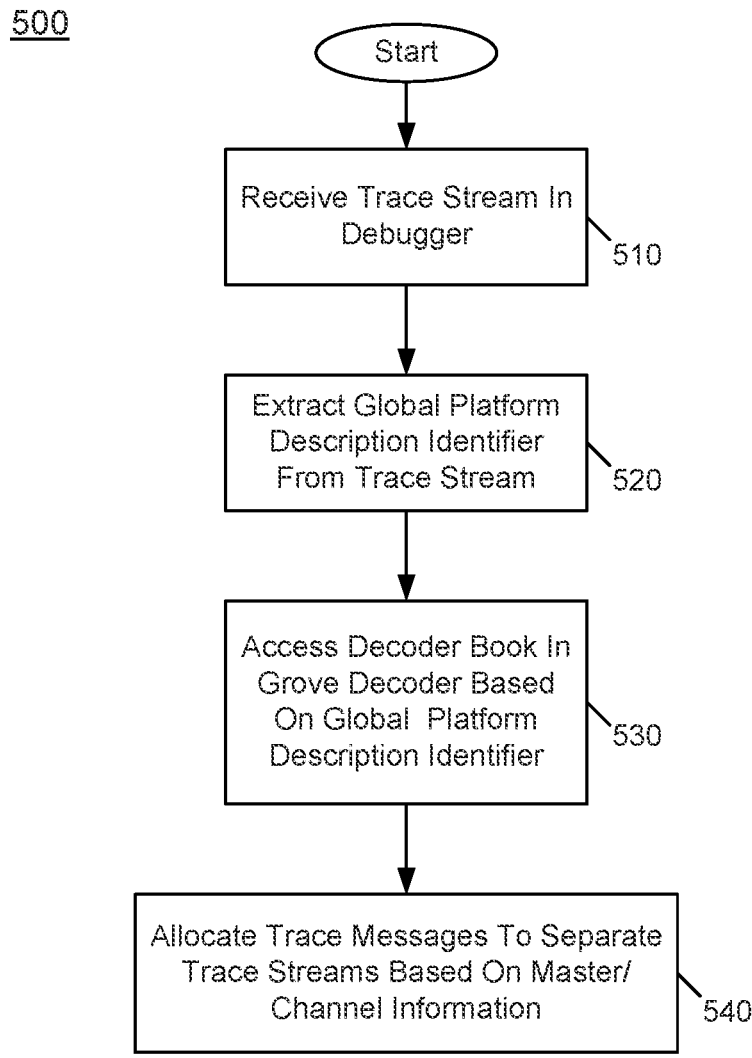
FIG. 5 is a flow diagram of a method in accordance with yet another embodiment of the present invention.

Referring now to FIG. 5, shown is a flow diagram of a method in accordance with yet another embodiment of the present invention. More specifically, method 500 shown in FIG. 5 is a method for handling an incoming trace stream in a debugger in accordance with an embodiment. As such, method 500 may be performed by hardware circuitry, firmware, software and/or combinations thereof such as may be implemented in a given debug and test system.

Method 500 begins by receiving a trace stream in a debugger (block 510). Next at block 520, a global PDID may be extracted from this trace stream. Using this extracted global PDID, the debugger may access a decoder book (of multiple such decoder books) in a grove decoder (block 530). As such, the global PDID acts as a root to identify a particular decoder book within the decoder structure. Next the debugger may allocate trace messages to different trace streams based on master/channel information (block 540). That is, as an incoming trace stream may include interleaved trace messages and PDIDs from various trace sources, to properly decode this information, the trace messages and corresponding PDIDs may be separated into different streams and may be, e.g., temporarily stored in a given buffer storage. To enable this parsing of incoming trace messages, master/channel information included in the trace messages may be used to allocate individual trace messages to the appropriate trace stream. Understand while shown at this high level in the embodiment of FIG. 5, many variations and alternatives are possible.

Figure 6:
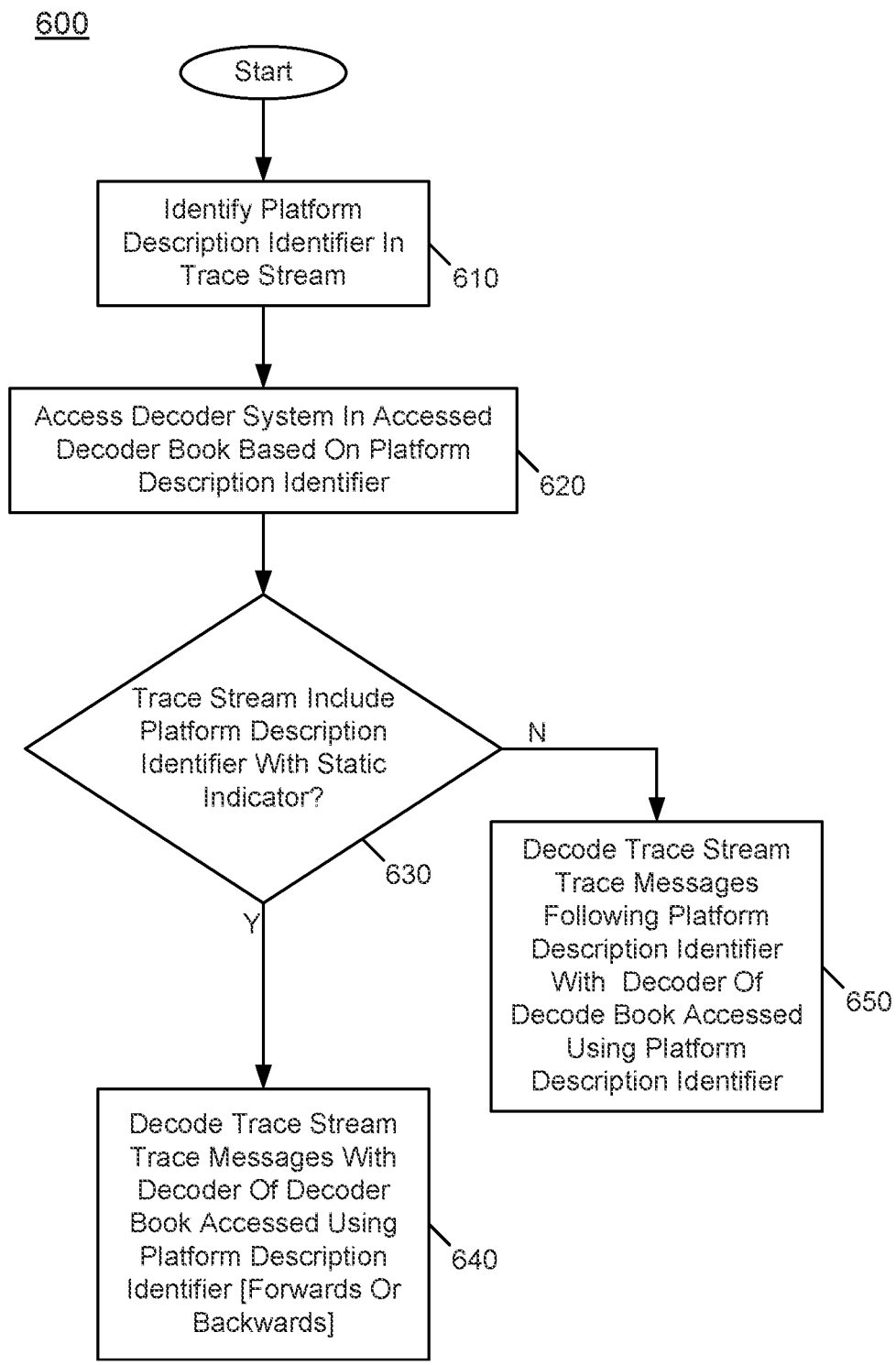
FIG. 6 is a flow diagram of a method in accordance with a still further embodiment of the present invention.

Referring now to FIG. 6, shown is a flow diagram of a method in accordance with a still further embodiment of the present invention. More specifically, method 600 shown in FIG. 6 is a method for performing decoding of trace information in accordance with an embodiment. As such, method 600 may be performed by hardware circuitry, firmware, software and/or combinations thereof such as may be implemented in a given debug and test system.

As illustrated, method 600 begins by identifying a PDID within a trace stream (block 610). Using this PDID, a given decoder system within the decoder book (in turn accessed using a global PDID) is accessed (block 620). Still with reference to FIG. 6, control passes from block 620 to diamond 630 where it is determined whether the PDID includes a static indicator. If so, control passes to block 640 where trace messages within this trace stream may be decoded with the decoder using the accessed decoder system, both in a forwards and backwards manner. That is, trace messages may be decoded regardless of whether the trace messages were received before or after receipt of the local PDID. As such, decoding may be performed according to a two-step process in which for a first step, trace messages following the static PDID can be decoded. Then in a second step, trace messages preceding the static PDID within the trace stream also can be decoded.

In contrast, in situations where a PDID is a dynamic identifier, only messages received after receipt of the local PDID may be properly decoded using a given decoder subsystem. Thus when it is determined at diamond 630 that the PDID is not associated with a static indicator (and thus is associated with a dynamic indicator), control passes to block 650, where trace messages following the PDID within this trace stream may be decoded with the decoder using the accessed decoder system. Note in this case with a dynamic PDID, only trace messages following the PDID in the trace stream can be decoded. Understand while shown at this high level in the embodiment of FIG. 6, many variations and alternatives are possible.

Figure 7:
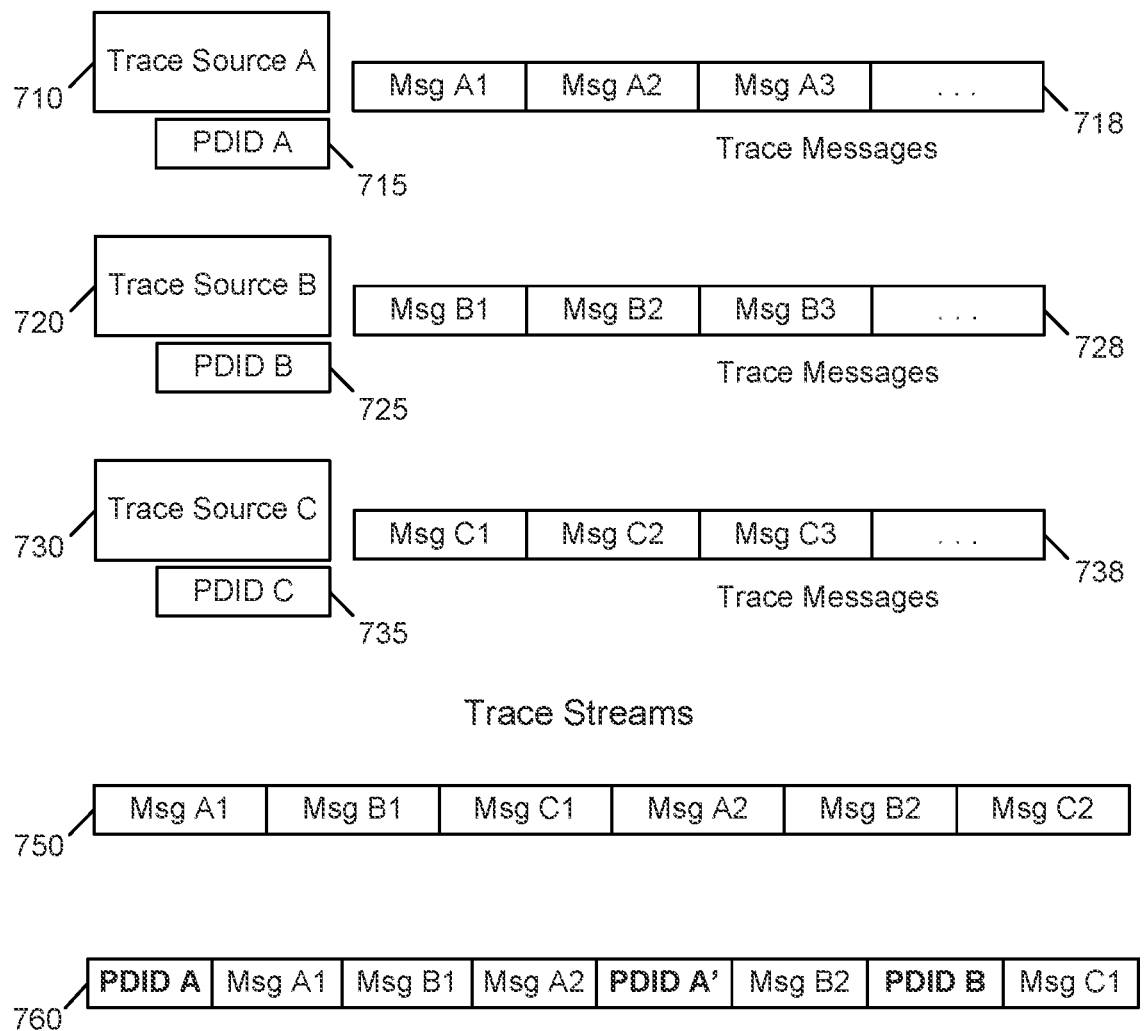
FIG. 7 is a diagram illustrating representative trace sources and resulting trace messages and trace streams in accordance with an embodiment.

Referring now to FIG. 7, shown is a diagram illustrating representative trace sources and resulting trace messages and trace streams in accordance with an embodiment. As shown in FIG. 7, in an environment 700, multiple trace sources 710, 720, 730 may be present. Such trace sources may be representative hardware circuits, firmware engines, or so forth. In any event, each trace source is associated with a corresponding (local) PDID 715, 725, 735. During debug operations, each trace source may generate a stream of trace messages, respectively, trace message streams 718, 728, 738.

Such trace messages, along with the corresponding PDID is sent from a given trace source to a trace aggregator (not shown for ease of illustration in FIG. 7). The trace aggregator may be configured to interleave incoming trace messages to generate trace streams. Two representative trace streams 750 and 760 are shown in FIG. 7. Trace stream 750 may be a portion of a given trace stream in which interleaved trace messages from the above three trace sources are included. Note however that in this subset of a trace stream, only trace messages are included, and not any PDIDs. Of course note that each such trace message may include appropriate identification information, e.g., in the form of master/channel information, to act as an alias for a larger address.

In turn, trace stream 760 shows an instance in which these PDIDs are included with interleaved trace messages in a trace stream. Note further that with regard to representative trace source 710, a dynamic PDID (PDID A') is further sent, illustrating a dynamic update to a local PDID, e.g., as a result of a change to trace source 710 (such as execution of a new application, paging in of a different firmware or so forth). With merged trace streams 750, 760, a resulting single trace stream is output for exporting via a given streaming interface (e.g., universal serial bus (USB), Peripheral Component Interconnect Express (PCIe), wireless local area network (WLAN)) or for local storage (e.g., dynamic random access memory (DRAM), static random access memory (SRAM), solid state drive (SSD)). As illustrated the PDID may be sent at the beginning of a trace stream (e.g., PDID A for an application start in FIG. 7) or during the stream (e.g., periodic firmware PDID B). It is also possible that a trace source sends an updated PDID (e.g., dynamically loading of additional libraries and PDID A' in FIG. 7) after dynamic changes in the trace source.

In an embodiment, a PDID message is composed of 0 . . . n PDID data packets, terminated via a PDID_TS packet. TS is a time-stamp, allowing the time correlation of dynamic PDIDs. Both PDID and PDID_TS packets can be configured to be master/channel bound. A PDID message is framed by the timestamp (as an end of message marker). Several PDID/PDID_TS packets construct a complete message. The size is flexible.

Figure 8:
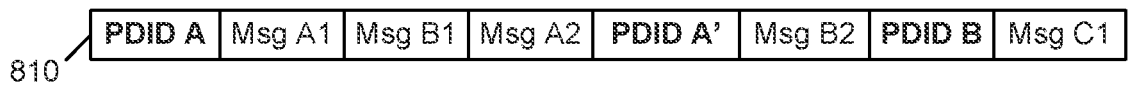
FIG. 8 is an illustration of a decoding process in accordance with an embodiment.
Figure 8:
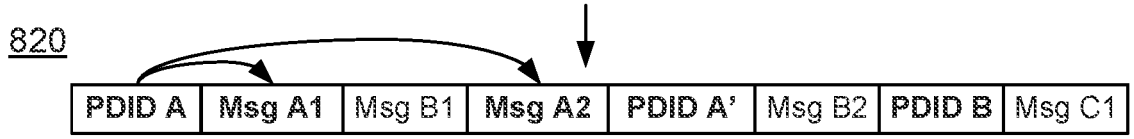
Figure 8:
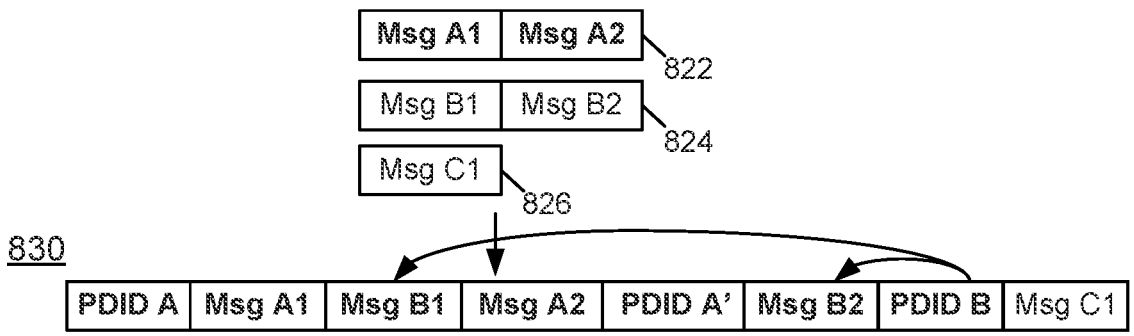
Figure 8:
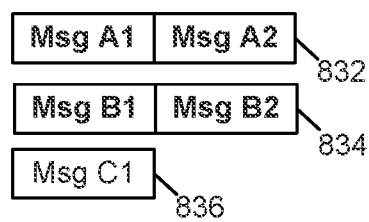
Figure 8:
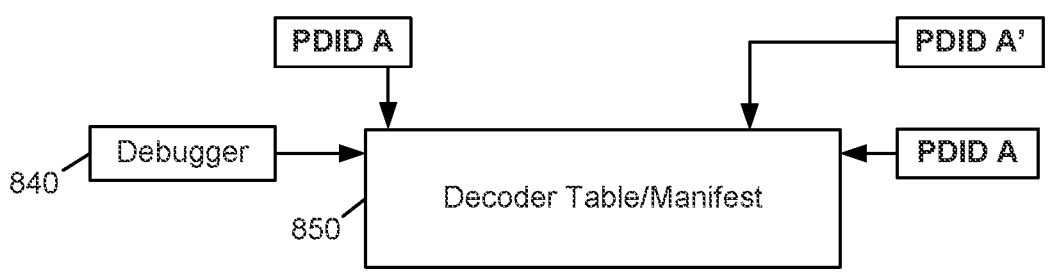

Referring now to FIG. 8, shown is an illustration of a decoding process 800 in accordance with an embodiment. Decoding process 800 may be executed by a debugger as present in a given debug and test system, which may be implemented with hardware circuitry, firmware, software and/or combinations thereof. In embodiments herein, a debugger 840 couples to a decoder table 850/manifest, which may be a hierarchical decoder structure as described herein.

As illustrated in FIG. 8, a trace stream 810 is received that includes various trace messages, with PDIDs interleaved within the trace stream. In a first decoding step (illustrated at 820), messages for a first trace source associated with a first local PDID (PDID A) may be decoded in a forward direction as these trace messages (messages A1, A2) follow after the PDID. This forward-based decoding may thus occur for a variety of trace sources, including those associated with flexible or dynamic PDIDs (namely those which may change over time). Thus as illustrated in decoding process 820, bolded messages 822 associated with this first trace source may be decoded. As further illustrated in this decoding step, messages associated with other trace sources (namely sources B and C) may be parsed into separate trace sources 824 and 826. Yet these messages may not yet be decoded (as illustrated with bold in FIG. 8) as there has been no receipt of corresponding PDIDs for these trace sources received prior to these trace messages.

However at a second step of a decoding process (illustrated at 830), backwards decoding of trace messages associated with trace source B may occur (as shown in bold in trace stream 834) as a local PDID (PDID B) is received, and is a fixed PDID, such that backwards based decoding may be performed. However note that at this stage, as no PDID has been received for trace source C, a message 836 remains undecoded.

To enable the decoding as described herein, the PDIDs may act as pointers or addresses to access corresponding decoder subsystems within decoder table 850 to obtain the appropriate decoding information to enable decoding of the given trace streams in debugger 840. Although shown at this high level in the embodiment of FIG. 8, many variations and alternatives are possible. Thus with embodiments, any trace source related to a static PDID can be decoded backwards. That is, with a second decoding step, messages received prior to the PDID in clear text also can be decoded. Instead if the PDID is flexible, the traces prior receiving the PDID cannot be decoded and are discarded.

In an embodiment, the PDID messages contain packet length information (e.g., in nibbles), a predefined type information, an indication as to when the trace source does dynamic ID assignments, some reserved fields and the actual payload.

Figure 9A:
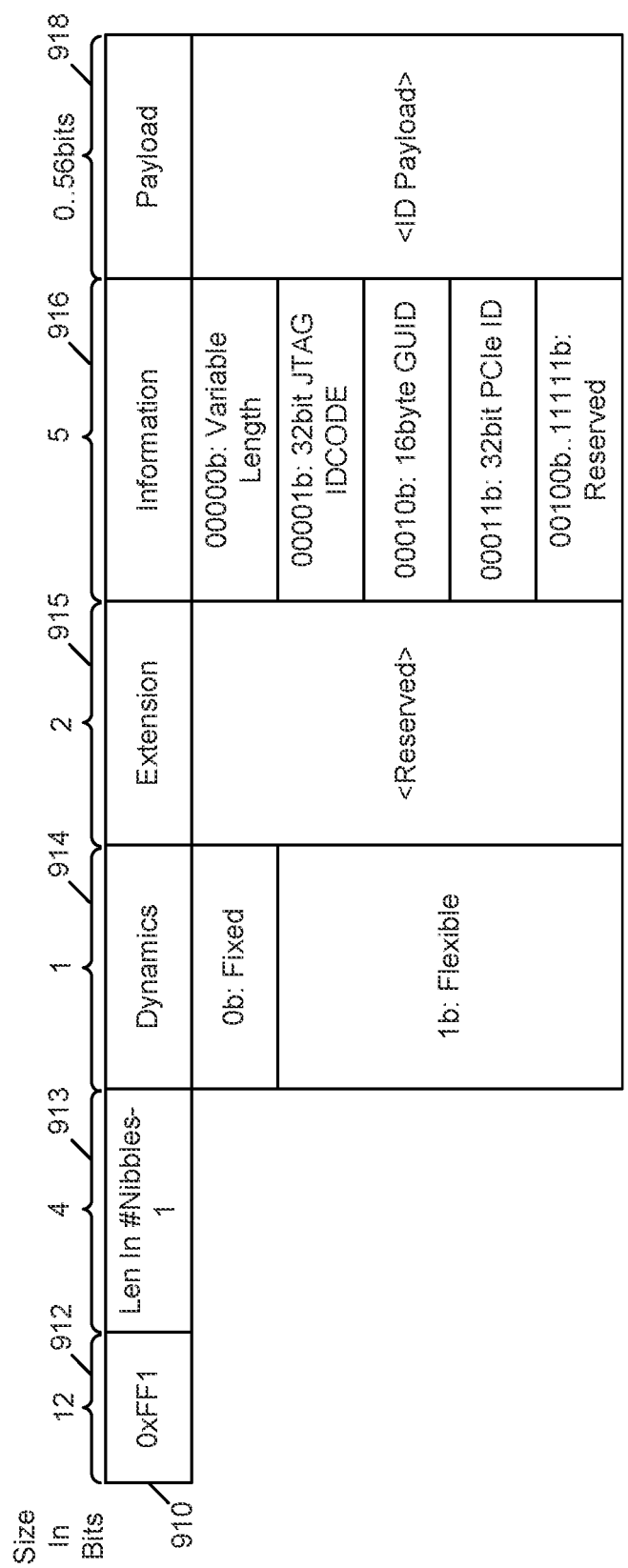
FIG. 9A is a data format of a PDID message in accordance with an embodiment of the present invention.

Referring now to FIG. 9A, shown is a data format of a PDID message in accordance with an embodiment of the present invention. As illustrated in FIG. 9A, PDID message 910 includes an opcode field 912 to identify the message type, a length field 913 to identify a length of the PDID message, a dynamic field 914 to indicate whether the PDID (and thus the corresponding trace source) is dynamic (e.g., trace messages change dynamically as OS applications) or fixed, an extension field 915 which may be reserved, an information field 916 to identify the type of information included in the PDID message (e.g., a JTAG code, a GUID, a PCIe ID, or so forth), and a payload field 918 that includes the actual identifier payload. If the PDID message is sent on Master ID/Channel ID 0/0, it is a global ID. As the MIPI ASYNC message sets the master and channel ID to zero, it is clear that a PDID following immediately is a global ID.

Figure 9B:
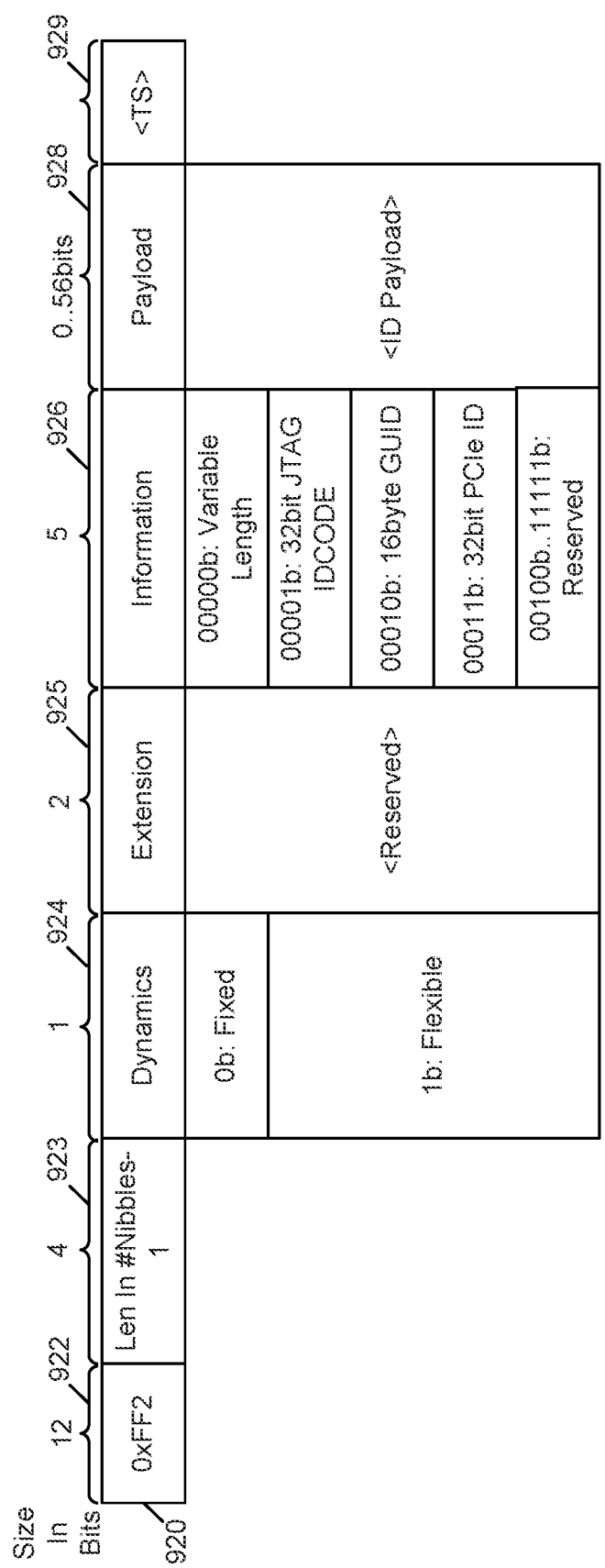
FIG. 9B is a data format of a PDID timestamp message in accordance with an embodiment of the present invention.

Referring now to FIG. 9B, shown is a data format of a PDID timestamp message in accordance with an embodiment of the present invention. PDID timestamp message 920 may generally include the same fields and information (with a different opcode in opcode field 922). And, following a payload field 928, a timestamp field 929 is present that is to provide the given timestamp.

Figure 10:
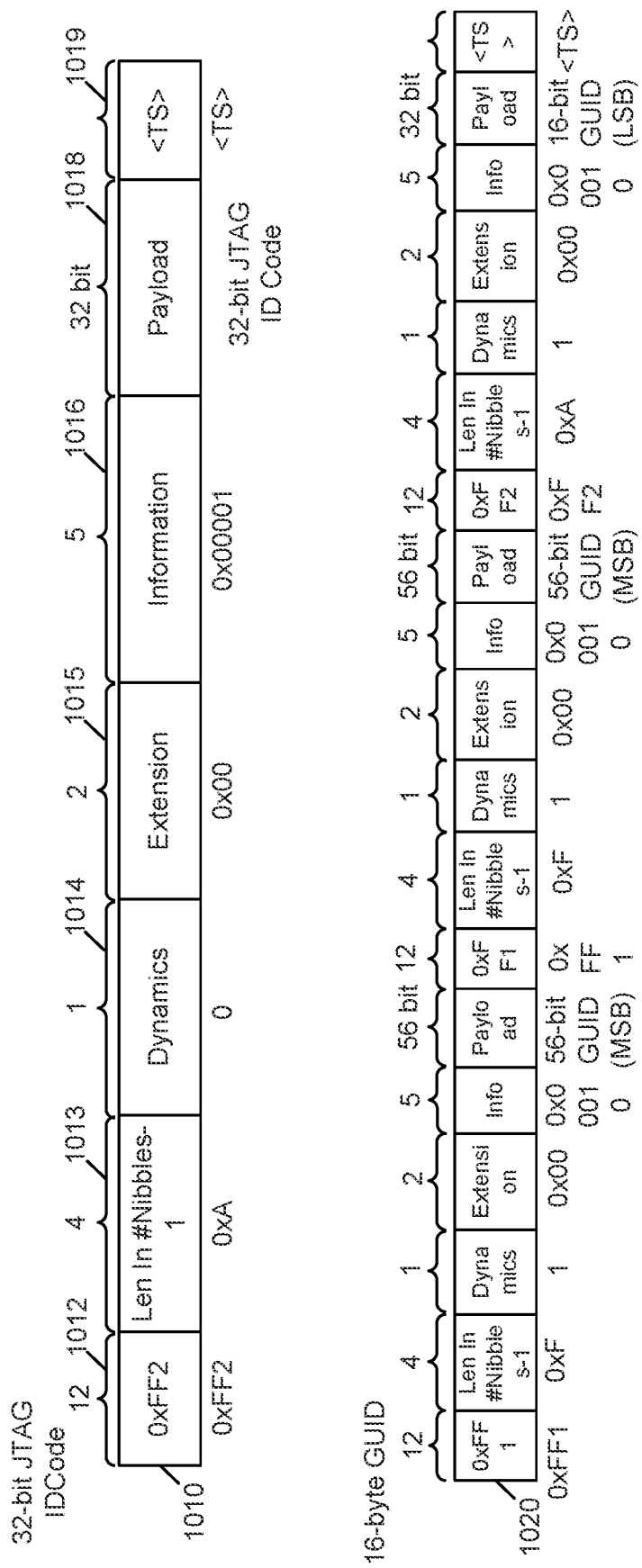
FIG. 10 is a data format of example PDID messages in accordance with an embodiment of the present invention.

Referring now to FIG. 10, shown are example PDID messages 1010, 1020 that may be used to communicate different types of identifiers, namely a 32-bit JTAG ID code (in PDID 1010) and a 16-byte GUID (in PDID 1020). With this method, a 32-bit global JTAG IDCode can be sent on MID/CID 0/0 as in message 1010 below in message 1020. A 16-byte GUID can be constructed by 3 messages, where the last is marked by a time-stamp, also shown in FIG. 10. Understand of course that other implementations for communicating such messages are possible.

Figure 11:
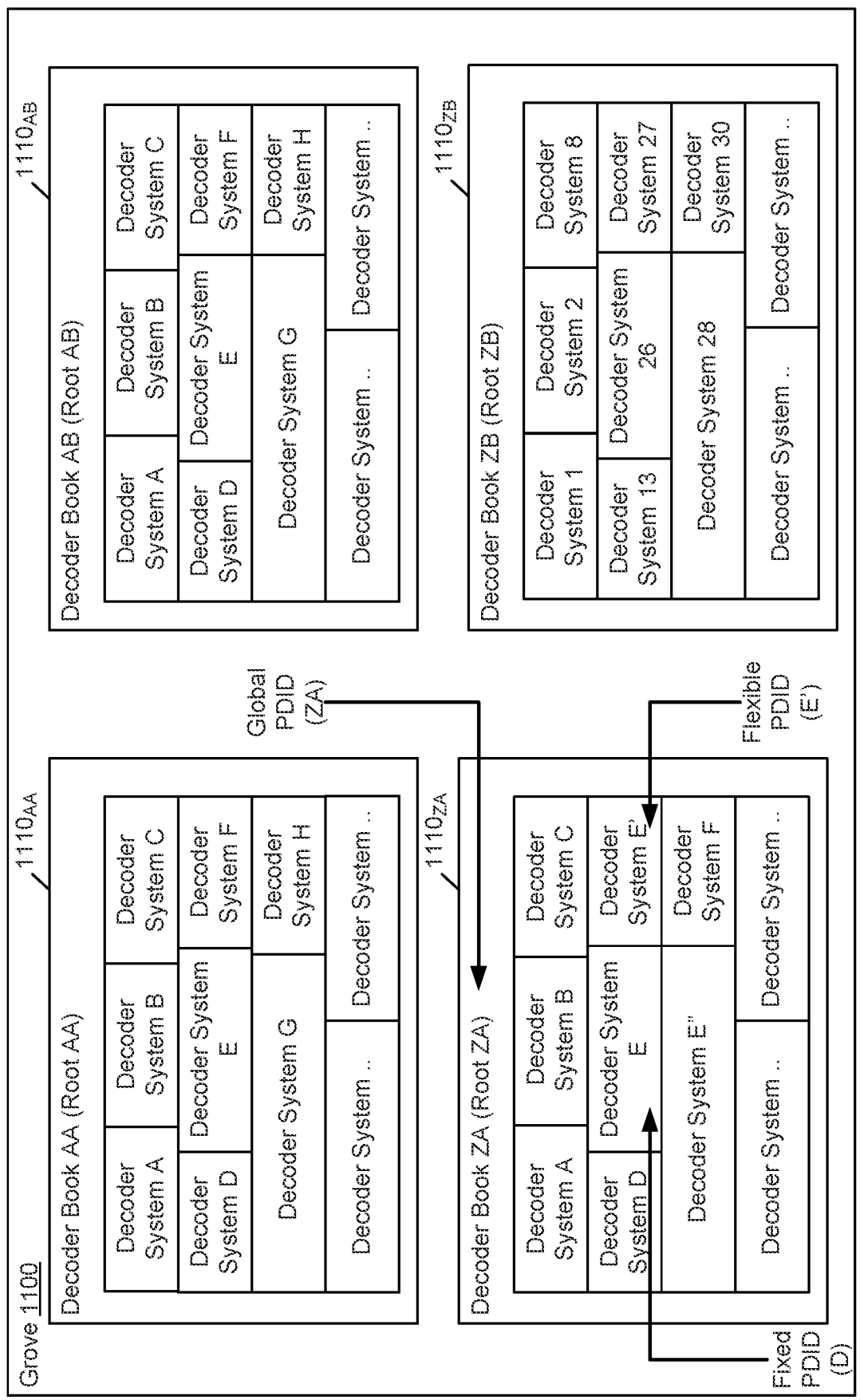
FIG. 11 is a block diagram of a decoder structure in accordance with an embodiment.

Referring now to FIG. 11, shown is a block diagram of a decoder structure in accordance with an embodiment. This decoder structure may be stored in a given non-transitory memory such as may be present or associated with a debug and test system. As illustrated in FIG. 11, decoder structure 110$_0$ is a hierarchical decoder, referred to herein as a grove, that includes a plurality of separate decoder books 1110$_{AA}$, $_{AB}$, $_{ZA}$, and $_{ZB}$. Each such decoder book 1110 acts as a root. In turn, each decoder book may be accessed using a given global PDID. When such global PDID is received, a given global book 1110 is accessed. Then, based on received local PDIDs, given decoder subsystems (each associated with a local PDID) may be accessed to provide appropriate decoder information for decoding trace messages associated with a particular trace source. Understand while shown at this high level in the embodiment of FIG. 11, many variations and alternatives are possible.

With embodiments, tracing may be performed to efficiently enable decoding of traces from complex platforms. While in some cases it may not be possible to decode every single trace in a real dynamic system, as costs would be too high to have a unique 1:1 trace-to-decoder relationship. But with an embodiment having a tiered approach (root, stem, branch), efficient decoding of a dynamic system can be performed with reduced complexity, overhead, and bandwidth. Thus debugging may be performed more efficiently, realizing quicker identification of problems in a debugged system, and reducing time to market in development of SoCs and systems implementing such SoCs.

Figure 12:
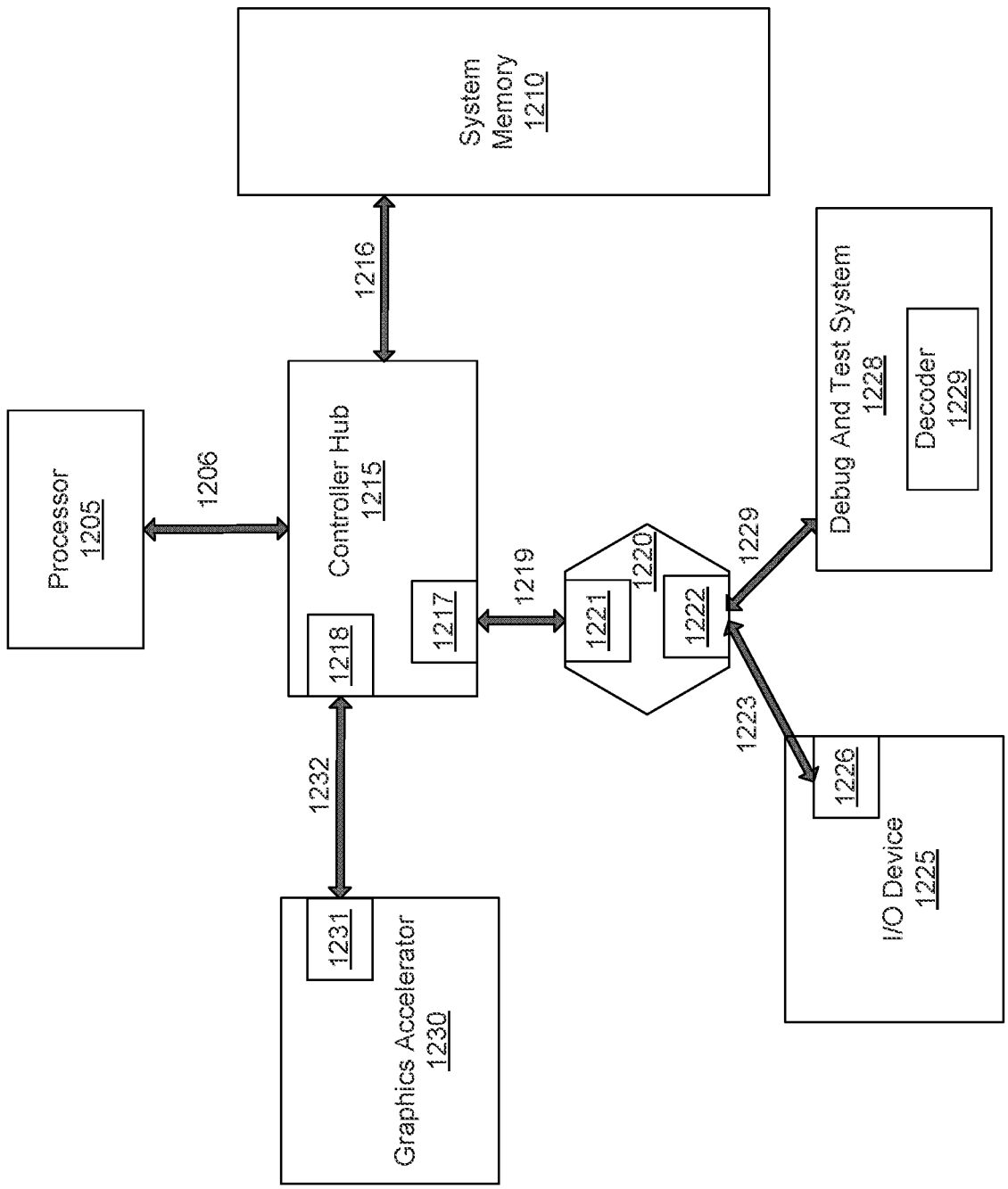
FIG. 12 is an embodiment of a fabric composed of point-to-point links that interconnect a set of components.

Embodiments may be implemented in a wide variety of systems. Referring to FIG. 12, an embodiment of a fabric composed of point-to-point links that interconnect a set of components is illustrated. System 120$_0$ includes processor 1205 and system memory 1210 coupled to a controller hub 1215. Processor 1205 includes any processing element, such as a microprocessor, a host processor, an embedded processor, a co-processor, or other processor. Processor 1205 is coupled to controller hub 1215 through front-side bus (FSB) 1206. In one embodiment, FSB 1206 is a serial point-to-point interconnect. In an embodiment, where processor 1205 and controller hub 1215 are implemented on a common semiconductor die, bus 1206 may be implemented as an on-die interconnect. In yet another implementation where processor 1205 and controller hub 1215 are implemented as separate die within a multi-chip package, bus 1206 can be implemented as an intra-die interconnect.

System memory 1210 includes any memory device, such as random access memory (RAM), non-volatile (NV) memory, or other memory accessible by devices in system 120$_0$. System memory 1210 is coupled to controller hub 1215 through memory interface 1216. Examples of a memory interface include a double-data rate (DDR) memory interface, a dual-channel DDR memory interface, and a dynamic RAM (DRAM) memory interface.

In one embodiment, controller hub 1215 is a root hub, root complex, or root controller in a PCIe interconnection hierarchy. Examples of controller hub 1215 include a chipset, a peripheral controller hub (PCH), a memory controller hub (MCH), a northbridge, an interconnect controller hub (ICH), a southbridge, and a root controller/hub. Often the term chipset refers to two physically separate controller hubs, i.e. a memory controller hub (MCH) coupled to an interconnect controller hub (ICH). Note that current systems often include the MCH integrated with processor 1205, while controller 1215 is to communicate with I/O devices, in a similar manner as described below. In some embodiments, peer-to-peer routing is optionally supported through root complex 1215.

Here, controller hub 1215 is coupled to switch/bridge 1220 through serial link 1219. Input/output modules 1217 and 1221, which may also be referred to as interfaces/ports 1217 and 1221, include/implement a layered protocol stack to provide communication between controller hub 1215 and switch 1220. In one embodiment, multiple devices are capable of being coupled to switch 1220.

Switch/bridge 1220 routes packets/messages from device 1225 upstream, i.e., up a hierarchy towards a root complex, to controller hub 1215 and downstream, i.e., down a hierarchy away from a root controller, from processor 1205 or system memory 1210 to device 1225. Switch 1220, in one embodiment, is referred to as a logical assembly of multiple virtual PCI-to-PCI bridge devices. Device 1225 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices and which may be coupled via an I3C bus, as an example. Often in the PCIe vernacular, such a device is referred to as an endpoint. Although not specifically shown, device 1225 may include a PCIe to PCI/PCI-X bridge to support legacy or other version PCI devices. Endpoint devices in PCIe are often classified as legacy, PCIe, or root complex integrated endpoints.

As further illustrated in FIG. 12, another device that may couple to switch/bridge 1220 is a debug and test system 1228 to perform decoding using PDIDs to access decoder subsystems of (potentially) multiple decoder books present in a decoder 1229.

Graphics accelerator 1230 is also coupled to controller hub 1215 through serial link 1232. In one embodiment, graphics accelerator 1230 is coupled to an MCH, which is coupled to an ICH. Switch 1220, and accordingly I/O device 1225, is then coupled to the ICH. I/O modules 1231 and 1218 are also to implement a layered protocol stack to communicate between graphics accelerator 1230 and controller hub 1215. A graphics controller or the graphics accelerator 1230 itself may be integrated in processor 1205.

Figure 13:
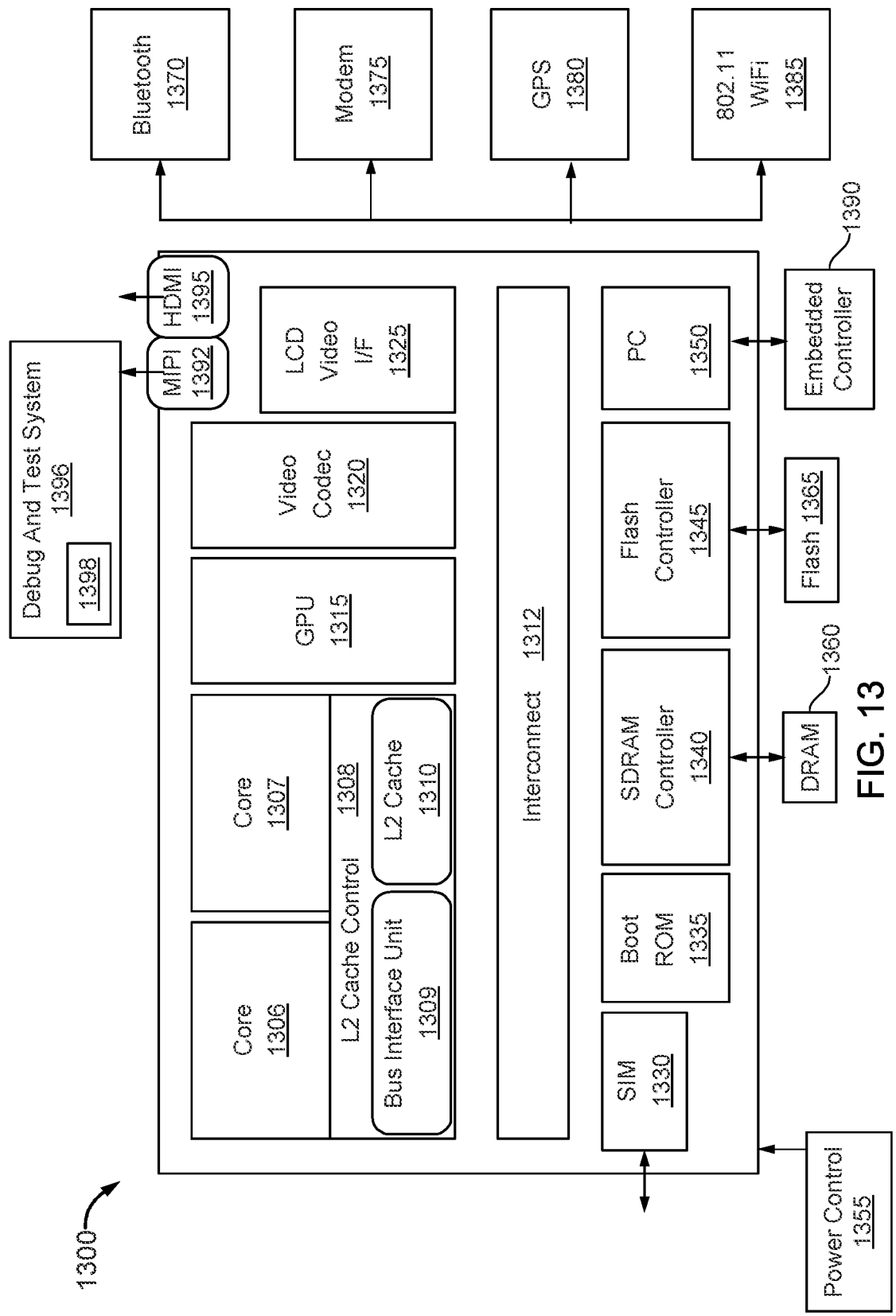
FIG. 13 is an embodiment of a system-on-chip design in accordance with an embodiment.

Turning next to FIG. 13, an embodiment of a SoC design in accordance with an embodiment is depicted. As a specific illustrative example, SoC 1300 may be configured for insertion in any type of computing device, ranging from portable device to server system. Here, SoC 1300 includes 2 cores 1306 and 1307. Cores 1306 and 1307 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1306 and 1307 are coupled to cache control 1308 that is associated with bus interface unit 1309 and L2 cache 1310 to communicate with other parts of system 1300 via an interconnect 1312.

Interconnect 1312 provides communication channels to the other components, such as a Subscriber Identity Module (SIM) 1330 to interface with a SIM card, a boot ROM 1335 to hold boot code for execution by cores 1306 and 1307 to initialize and boot SoC 1300, a SDRAM controller 1340 to interface with external memory (e.g., DRAM 1360), a flash controller 1345 to interface with non-volatile memory (e.g., flash memory 1365), a peripheral controller 1350 (e.g., via an eSPI interface) to interface with peripherals, such as an embedded controller 1390.

Still referring to FIG. 13, system 1300 further includes video codec 1320 and video interface 1325 to display and receive input (e.g., touch enabled input), GPU 1315 to perform graphics related computations, etc. Any of these interconnects/interfaces may incorporate aspects described herein, including hardware-based credit control and bus turnarounds. In addition, the system illustrates peripherals for communication, such as a Bluetooth module 1370, 3G modem 1375, GPS 1380, and WiFi 1385. Also included in the system is a power controller 1355. Further illustrated in FIG. 13, system 1300 may additionally include interfaces including a MIPI interface 1392 to couple to, e.g., a debug and test system 1396 including a decoder 1398 configured to operate as described herein, and/or an HDMI interface 1395 which may couple to a display.

Figure 14:
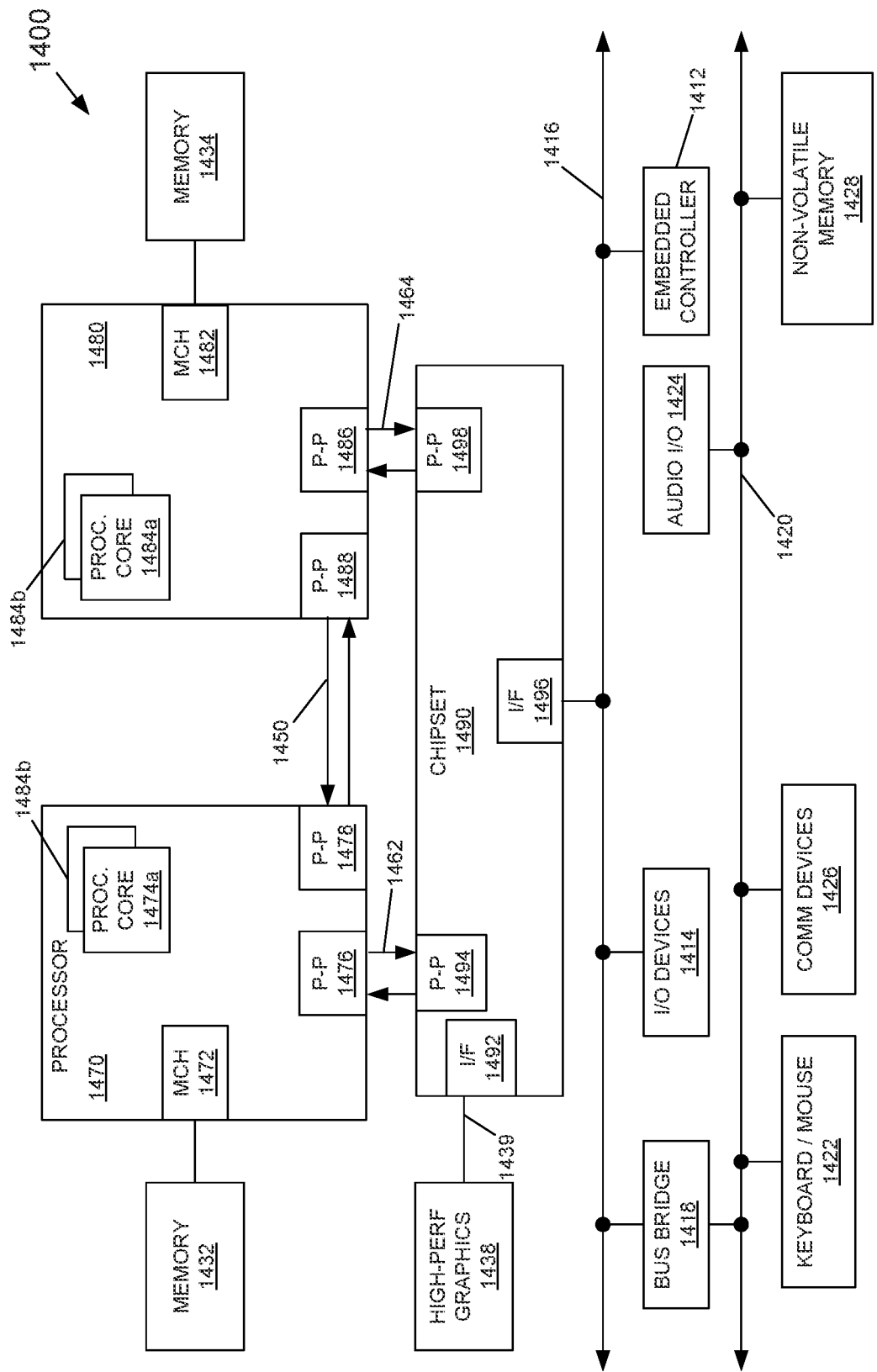
FIG. 14 is a block diagram of a system in accordance with an embodiment of the present invention.

Referring now to FIG. 14, shown is a block diagram of a system in accordance with an embodiment of the present invention. As shown in FIG. 14, multiprocessor system 1400 includes a first processor 1470 and a second processor 1480 coupled via a point-to-point interconnect 1450. As shown in FIG. 14, each of processors 1470 and 1480 may be many core processors including representative first and second processor cores (i.e., processor cores 1474a and 1474b and processor cores 1484a and 1484b).

Still referring to FIG. 14, first processor 1470 further includes a memory controller hub (MCH) 1472 and point-to-point (P-P) interfaces 1476 and 1478. Similarly, second processor 1480 includes a MCH 1482 and P-P interfaces 1486 and 1488. As shown in FIG. 14, MCH's 1472 and 1482 couple the processors to respective memories, namely a memory 1432 and a memory 1434, which may be portions of system memory (e.g., DRAM) locally attached to the respective processors. First processor 1470 and second processor 1480 may be coupled to a chipset 1490 via P-P interconnects 1462 and 1464, respectively. As shown in FIG. 14, chipset 1490 includes P-P interfaces 1494 and 1498.

Furthermore, chipset 1490 includes an interface 1492 to couple chipset 1490 with a high performance graphics engine 1438, by a P-P interconnect 1439. As shown in FIG. 14, various input/output (I/O) devices 1414 may be coupled to first bus 1416, along with a bus bridge 1418 which couples first bus 1416 to a second bus 1420. Various devices may be coupled to second bus 1420 including, for example, a keyboard/mouse 1422, communication devices 1426 and a non-volatile memory 1428. Further, an audio I/O 1424 may be coupled to second bus 1420. System 1400 may communicate with a debug and test system, and provide PDIDs to enable efficient debugging as described herein.

The following examples pertain to further embodiments.

In one example, an apparatus includes: a first trace source to generate a plurality of first trace messages and a first local platform description identifier to identify the first trace source, the first trace source comprising a first hardware agent; a second trace source to generate a plurality of second trace messages and a second local platform description identifier to identify the second trace source, the second trace source comprising a second hardware agent; and a trace aggregator coupled to the first and second trace sources. The trace aggregator may generate a global platform description identifier for the apparatus and send a trace stream to a destination that includes the global platform destination identifier, the first and second local platform description identifiers, the plurality of first trace messages and the plurality of second trace messages. The global platform description identifier comprises a root identifier to enable a debug and test system to identify a decoder book of a plurality of decoder books to access, where the decoder book has a plurality of decoder subsystems including a first decoder subsystem to be accessed using the first local platform description identifier and a second decoder subsystem to be accessed using the second local platform description identifier.

In an example, the trace stream comprises the first local platform description identifier interleaved with one or more of the plurality of first trace messages.

In an example, the first trace source is to dynamically generate the first local platform description identifier for association with a first application and to dynamically generate a third local platform description identifier for association with a second application, where the debug and test system is to access a third decoder subsystem of the plurality of decoder subsystems of the decoder book using the third local platform description identifier.

In an example, the first trace source is to output a first portion of the plurality of first trace messages following the first local platform description identifier and output a second portion of the plurality of first trace messages following the third local platform description identifier.

In an example, the debug and test system is to decode the first portion of the plurality of first trace messages following the first local platform description identifier using the first decoder subsystem and decode the third portion of the plurality of first trace messages following the third local platform description identifier using the third decoder subsystem.

In an example, the first local platform description identifier and the third local platform description identifier each include a first field to indicate that the first trace source comprises a dynamic agent.

In an example, the debug and test system is to decode a first portion of the plurality of second trace messages preceding the second local platform description identifier and decode a second portion of the plurality of second trace messages following the second local platform description identifier, where the second local platform description identifier comprises a static identifier.

In an example, the trace aggregator is to send an asynchronous message to set a master identifier to a first predetermined value and set a channel identifier to a second predetermined value, and to thereafter send the global platform description identifier having the first predetermined value for the master identifier and the second predetermined value for the channel identifier.

In an example, the apparatus comprises a system on chip including a first die having the first trace source and a second die having the second trace source.

In another example, a method comprises: receiving, in a debugger system, a trace stream from a system under test; extracting a global platform description identifier from the trace stream; accessing a first decoder book of a plurality of decoder books of a decoder based on the global platform description identifier; identifying a first local platform description identifier in the trace stream; accessing a first decoder subsystem in the first decoder book based on the first local platform description identifier; and decoding one or more trace messages in the trace stream from a first trace source associated with the first local platform description identifier using the first decoder subsystem.

In an example, decoding the one or more trace messages from the first trace stream comprises decoding the one or more trace messages received in the debugger subsystem prior to the first local platform description identifier, the first local platform description identifier comprising a static identifier.

In an example, the method further comprises: identifying a second local platform description identifier in the trace stream; accessing a second decoder subsystem in the first decoder book based on the second local platform description identifier; and decoding one or more trace messages in the trace stream from the first trace source associated with the second local platform description identifier using the second decoder subsystem.

In an example, the method further comprises: in a first decoding process, decoding one or more trace messages from a second trace source associated with a second local platform description identifier using a second decoder subsystem, the one or more trace messages received in the debugger system following the receipt of the second local platform description identifier; and in a second decoding process, decoding at least one other trace message from the second trace source associated with the second local platform description identifier using the second decoder subsystem, the at least one other trace message received in the debugger system preceding the receipt of the second local platform description identifier.

In an example, the method further comprises: identifying a third local platform description identifier in the trace stream; accessing a third decoder subsystem in the first decoder book based on the third local platform description identifier; and decoding one or more additional trace messages in the trace stream from the first trace source using the third decoder subsystem, the one or more additional messages received in the debugger system following the receipt of the third local platform description identifier, the first local platform description identifier and the third local platform description identifier comprising dynamic identifiers. In an example, In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In further example, a system includes a SoC including a first hardware circuit comprising a first trace source and a second hardware circuit comprising a second trace source, and a trace aggregator coupled to the first trace source and the second trace source to generate a global platform description identifier for the SoC and send a trace stream to a debug and test system. The trace stream includes the global platform destination identifier, a first local platform description identifier associated with the first trace source, a second local platform description identifier associated with the second trace source, a plurality of first trace messages from the first trace source and a plurality of second trace messages from the second trace source. The system further includes the debug and test system coupled to the SoC via an interconnect. The debug and test system comprises a hierarchical decoder structure including a plurality of decoder books, each of the plurality of decoder books having a plurality of decoder subsystems including a first decoder subsystem to be accessed using the first local platform description identifier and a second decoder subsystem to be accessed using the second local platform description identifier.

In an example, the first trace source is to dynamically generate the first local platform description identifier for association with a first application and to dynamically generate a third local platform description identifier for association with a second application.

In an example, the debug and test system is to access a third decoder subsystem of the plurality of decoder subsystems of the decoder book using the third local platform description identifier.

In an example, the first trace source is to output a first portion of the plurality of first trace messages following the first local platform description identifier and output a second portion of the plurality of first trace messages following the third local platform description identifier.

In an example, the debug and test system is to decode the first portion of the plurality of first trace messages following the first local platform description identifier using the first decoder subsystem and decode the third portion of the plurality of first trace messages following the third local platform description identifier using the third decoder subsystem.

In an example, the first local platform description identifier and the third local platform description identifier each include a first field comprising a dynamic indicator to indicate a dynamic identifier.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a first trace source to generate a first local platform description identifier to identify the first trace source, the first trace source to generate a plurality of first trace messages, wherein the first trace source comprises a first hardware agent;
a second trace source to generate a second local platform description identifier to identify the second trace source, the second trace source to generate a plurality of second trace messages, wherein the second trace source comprises a second hardware agent; and
a trace aggregator coupled to the first trace source and the second trace source, the trace aggregator to send a trace stream to a debug and test system, the trace stream including a global platform description identifier to identify the apparatus, the first local platform description identifier, the second local platform description identifier, the plurality of first trace messages, and the plurality of second trace messages.

2. The apparatus of claim 1, wherein the trace aggregator is to send the trace stream having the first local platform description identifier interleaved with at least some of the plurality of first trace messages and the plurality of second trace messages.

3. The apparatus of claim 1, wherein the first local platform description identifier is to be dynamically updated, and the trace aggregator to send the dynamically updated first local platform description identifier in the trace stream.

4. The apparatus of claim 3, wherein the first trace source is to send the dynamically updated first local platform description identifier having a field having a first value to indicate the dynamic update.

5. The apparatus of claim 1, wherein the apparatus comprises a system on chip (SoC).

6. The apparatus of claim 5, wherein the SoC comprises a first die and a second die.

7. The apparatus of claim 6, wherein the first die comprises the first trace source, the first trace source comprising a first controller.

8. The apparatus of claim 7, wherein the first die comprises a first trace aggregator to send the plurality of first trace messages and the first local platform description identifier to the trace aggregator.

9. The apparatus of claim 8, wherein the second die comprises the second trace source and the trace aggregator.

10. The apparatus of claim 5, wherein the SoC is to couple to the debug and test system via a link compatible with a parallel trace interface.

11. The apparatus of claim 1, wherein the plurality of first trace messages comprises master/channel information.

12. The apparatus of claim 1, wherein the plurality of first trace messages comprises debug information to enable debugging of the apparatus.

13. A non-transitory machine-readable medium comprising instructions, which if performed by a machine, cause the machine to:
receive, in a debug and test system (DTS), a trace stream from a target system;
identify, in the trace stream, a first local platform description identifier (PDID) associated with a first trace source of the target system and use the first local PDID to decode one or more trace messages associated with the first local PDID in the trace stream;
identify, in the trace stream, a second local PDID associated with a second trace source of the target system and use the second local PDID to decode one or more trace messages associated with the second local PDID in the trace stream; and
identify, in the trace stream, a global PDID associated with the target system and access information in a manifest using the global PDID.

14. The machine-readable medium of claim 13, further comprising instructions, which if performed by the machine, cause the machine to:
receive, in the trace stream, the global PDID following an ASYNC message.

15. The machine-readable medium of claim 13, further comprising instructions, which if performed by the machine, cause the machine to:
use the global PDID to select a decoder group of a plurality of decoder groups of the manifest.

16. The machine-readable medium of claim 13, further comprising instructions, which if performed by the machine, cause the machine to:
in a forward decoding process, decode the one or more trace messages from the first trace source; and
in a backward decoding process, decode the one or more trace messages from the second trace source.

17. The machine-readable medium of claim 13, further comprising instructions, which if performed by the machine, cause the machine to:
use the first local PDID to decode at least one trace message that follows the first local PDID in the trace stream; and
use the second local PDID to decode at least one trace message that is before the second local PDID in the trace stream.

18. A system on chip (SoC) comprising:
a first device to generate a first local platform description identifier to identify the first device, the first device to generate a plurality of first trace messages;
a second device to generate a second local platform description identifier to identify the second device, the second device to generate a plurality of second trace messages; and
a trace aggregator coupled to the first device and the second device, the trace aggregator to send a trace stream to a debug and test system, the trace stream including a global platform description identifier to identify the SoC, the first local platform description identifier, the second local platform description identifier, the plurality of first trace messages, and the plurality of second trace messages.

19. The SoC of claim 18, wherein the trace aggregator is to send the trace stream having the first local platform description identifier interleaved with at least some of the plurality of first trace messages and the plurality of second trace messages.

20. The SoC of claim 18, wherein the trace aggregator is to send the trace stream having the first local platform description identifier and thereafter a dynamically updated first local platform description identifier.

21. The SoC of claim 18, wherein the SoC comprises a first die and a second die.

22. The SoC of claim 18, wherein the first device comprises a controller and the second device comprises a Peripheral Component Interconnect Express (PCIe) device.

* * * * *